(12) United States Patent
Muramatsu

(10) Patent No.: US 6,533,089 B2
(45) Date of Patent: Mar. 18, 2003

(54) RATCHET ONE-WAY CLUTCH

(75) Inventor: Kazuhiko Muramatsu, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 0 days.

(21) Appl. No.: 09/884,164

(22) Filed: Jun. 20, 2001

(65) Prior Publication Data

US 2002/0005326 A1 Jan. 17, 2002

(30) Foreign Application Priority Data

Jun. 22, 2000 (JP) ........................................ 2000-187628

(51) Int. Cl.⁷ ................................................ F16D 41/12
(52) U.S. Cl. ...................................... 192/46; 192/110 B
(58) Field of Search ............................... 192/46, 41 R, 192/110 B, 113.32; 60/345

(56) References Cited

U.S. PATENT DOCUMENTS

| | | | | |
|---|---|---|---|---|
| 5,042,628 A | * | 8/1991 | Malecha | 192/41 R X |
| 5,186,296 A | * | 2/1993 | Kinoshita et al. | 192/41 R X |
| 5,671,836 A | * | 9/1997 | Shirataki et al. | 192/113.32 |
| 5,676,230 A | * | 10/1997 | Awaji et al. | 192/110 B |
| 5,947,245 A | * | 9/1999 | Costin et al. | 192/46 |

FOREIGN PATENT DOCUMENTS

JP    2001-159432 A  *  6/2002

\* cited by examiner

Primary Examiner—Richard M. Lorence
(74) Attorney, Agent, or Firm—Miles & Stockbridge P.C.

(57) ABSTRACT

A ratchet one-way clutch comprises an inner race and an outer race coaxially arranged to be relatively rotative; a pawl member arranged between the inner race and outer race to be fitted into a recessed portion provided for the outer circumferential face of the inner race or the inner circumferential face of the outer race for transmitting torque; a spring for biasing the pawl member to the recessed portion; and a bush for supporting the pawl member and spring and for providing a bearing between the inner race and outer race. For this clutch, a recessed portion is formed on an inner circumferential face of the bush.

15 Claims, 5 Drawing Sheets

RATCHET ONE-WAY CLUTCH

BACKGROUND OF THE INVENTION

1. Field of the Invention

The present invention relates to a transmission used for automobiles, agricultural machinery, construction machinery, and industrial machinery, among some others. More particularly, the invention relates to the ratchet one-way clutch that uses ratchet (pawl member) for a lock mechanism, among the one-way clutches used for an automatic transmission or the like adopted for vehicles to carry out the function of back stop or the like. More specifically, the invention relates to a ratchet one-way clutch provided with means for reducing the drag torque of bearing.

2. Related Background Art

In general, the one-way clutch used for the automatic transmission is provided with the outer race and inner race that rotate relatively, and arranged to transmit the rotational torque only in one direction by allowing the sprag, roller, and others, which transmit the torque between the outer and inner races, to engage with the surface of a cam provided for the raceway surface of the outer race or the inner race. Also, the structure is arranged so that the clutch makes idle rotation in the reverse direction.

Of the one-way clutches thus arranged, there is the ratchet one-way clutch that uses the ratchet as a torque transmission member that transmits torque between the outer and inner races. The ratchet one-way clutch comprises the outer race with pockets on the inner circumference thereof; the inner race with notches on the outer circumference thereof arranged coaxially with the outer race; the pawl member that transmits torque between the inner and outer races in a state of being engaged with each notch of the inner race housed in the pocket so as to lock the one-way clutch; and the elastic member such as a spring that biases the pawl member to the inner race.

The pawl member of the ratchet one-way clutch thus structured is made slidable freely on the outer circumference of the inner race when the one-way clutch rotates in one direction, thus enabling the outer race and inner race to relatively rotate idly. Then, when the one-way clutch begins to rotate in the other direction, the pawl member engages with the notch so that the one-way clutch is conditioned to be locked up.

It has been proposed to incorporate the ratchet one-way clutch in the stator of a torque converter.

For example, in the specification of U.S. Pat. No. 5,947,245, it has been proposed that the clutch of this type is used for the stator of a torque converter of an automobile automatic transmission. FIG. 8 is a sectional view which shows the conventional one-way clutch, taken in the axial direction. Also, FIG. 9 is a front view of the one-way clutch shown in FIG. 8.

As shown in FIG. 8 and FIG. 9, the stator 1 comprises an inner race 3 which engages with a stator shaft (not shown) installed on the inner circumference by use of a spline 9; a runner 8 provided with an outer race portion 4 on the inner circumferential side; pawl members 2, and springs 10 arranged respectively for each of the pockets 21 and 22 (see FIG. 9) installed on the outer race portion 4. Each spring 10 is prevented by a bush 31 from falling off in the axial direction. The bush 31 is fixed by use of a snap spring 5. Also, the end faces of the outer race 4 and the bush 31 in the axial direction are supported by the thrust bearing 7, respectively.

For the conventional one-way clutch thus structured, the bearing, that is, the inner circumferential sliding face of the bush 31, generates the dragging torque due to the influence of oil pressure exerted by the slidable movement thereof on the outer circumferential face 24 of the inner race 3, and the eccentric rotation. Particularly, the contact area is large for the inner circumference of slidably movable face of the bush 31, and the outer circumferential face 24 of the inner race 3. As a result, it is made difficult to reduce the dragging torque.

Also, due to this large contact area, there is a fear to impede the distribution of lubricant that lubricates the acting members centering on the pawl members 2 and notches 23. Further, it has not been sufficient to take measures in making the clutch light in weight and improving the fixing precision, among some others.

SUMMARY OF THE INVENTION

Now, therefore, it is an object of the present invention to provide a ratchet one-way clutch for which the dragging torque is made reducible, while the lubricating capability thereof is made attainable. It is another object of the invention to provide a ratchet one-way clutch for which it is attained to make the clutch light in weight, while enhancing the fixing precision thereof.

In order to achieve the objects described above, the ratchet one-way clutch of the present invention comprises an inner race and an outer race coaxially arranged to be relatively rotative; a pawl member arranged between the inner race and outer race to be fitted into a recessed portion provided for the outer circumferential face of the inner race or the inner circumferential face of the outer race for transmitting torque; a spring for biasing the pawl member to the recessed portion; and a bush for supporting the pawl member and spring axially and for providing a bearing between the inner race and outer race. For this clutch, a recessed portion is formed on the inner circumferential face of the bush.

Also, in accordance with the invention, an extrusion is provided for the outer circumference of the aforesaid bush to protrude outwardly in the diametral direction, and the bush is fixed by the extrusion being fitted into a recess portion provided for the outer race.

Further, in accordance with the invention, the aforesaid bush is provided on both ends in the axial direction of the ratchet one-way clutch.

The ratchet one-way clutch of the invention further comprises a block bearing provided at the inner circumference of the outer race.

In accordance with the invention, the ratchet one-way clutch comprises an inner race and an outer race coaxially arranged to be relatively rotative; a pawl member arranged between the inner race and outer race to be fitted into a recessed portion provided for the outer circumferential face of the inner race or the inner circumferential face of the outer race for transmitting torque; a spring for biasing the pawl member to the recessed portion; and a block bearing provided at the inner circumference of the outer race.

Also, in accordance with the invention, the aforesaid block bearing is provided with a through hole penetrating in the axial direction.

Also, in accordance with the invention, a second through hole is provided to penetrate from the aforesaid through hole to the inner race side.

Also, in accordance with the invention, the aforesaid block bearing is provided with an extrusion on the side portion thereof to protrude outwardly in the circumferential direction, and the block bearing is fixed by the extrusion being fitted into a recess portion arranged for the outer race.

The ratchet one-way clutch of the invention further comprises a bush for supporting the pawl member and spring in the axial direction and for providing a bearing between the inner race and outer race. For this clutch, a recessed portion is formed on the inner circumferential face of the bush.

In accordance with the invention, it becomes possible to reduce the contact area between the slidably movable inner circumferential face of the bearing and the outer circumferential face of the inner race, and also, to release the oil pressure which is exerted by minute eccentric rotation. Therefore, the dragging torque that may be generated can be reduced.

Also, with the smaller contact area thus provided, the distribution of lubricant oil is made in good condition to lubricate the operating members centering on the pawl member and recessed portion. Further, it becomes attainable to make the clutch lighter, as well as to enhance the fixing precision.

DETAILED DESCRIPTION OF THE PREFERRED EMBODIMENTS

Figure 8:
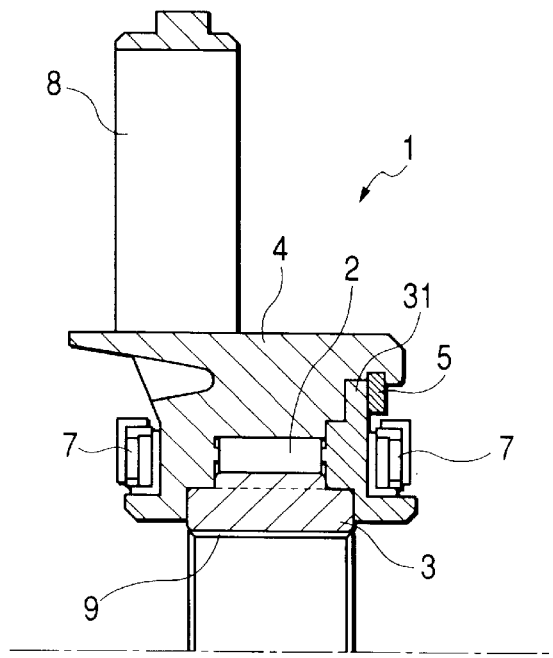
FIG. 8 is a sectional view which shows the conventional one-way clutch, taken in the axial direction thereof.
Figure 9:
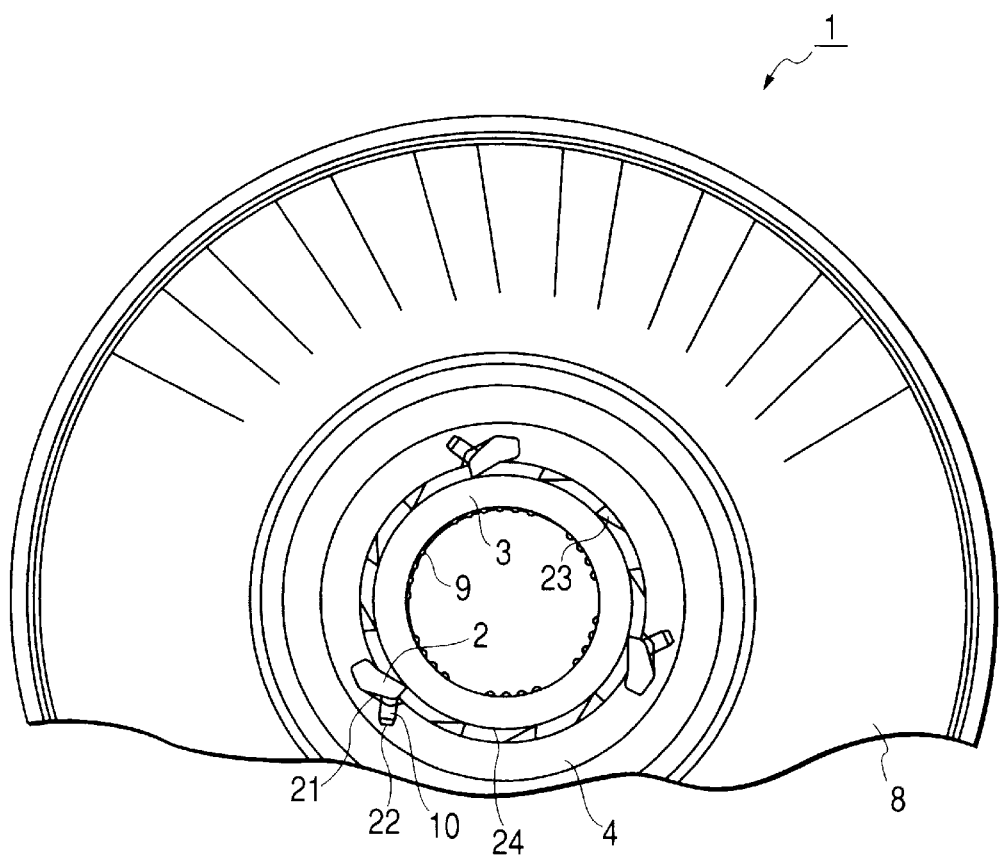
FIG. 9 is a front view which shows the one-way clutch represented in FIG. 8.

Hereinafter, with reference to the accompanying drawings, each of the embodiments will be described in detail in accordance with the present invention. Here, the same part will be indicated by the same reference mark in each of the accompanying drawings. Also, the fundamental structure of a torque converter, for which is used each ratchet one-way clutch embodying the present invention, is almost the same as the conventional one described in conjunction with FIG. 8 and FIG. 9. Therefore, as regards the apparatus as a whole, the description will be omitted. Also, the same reference marks as those appearing therein are used.

First Embodiment

Figure 1:
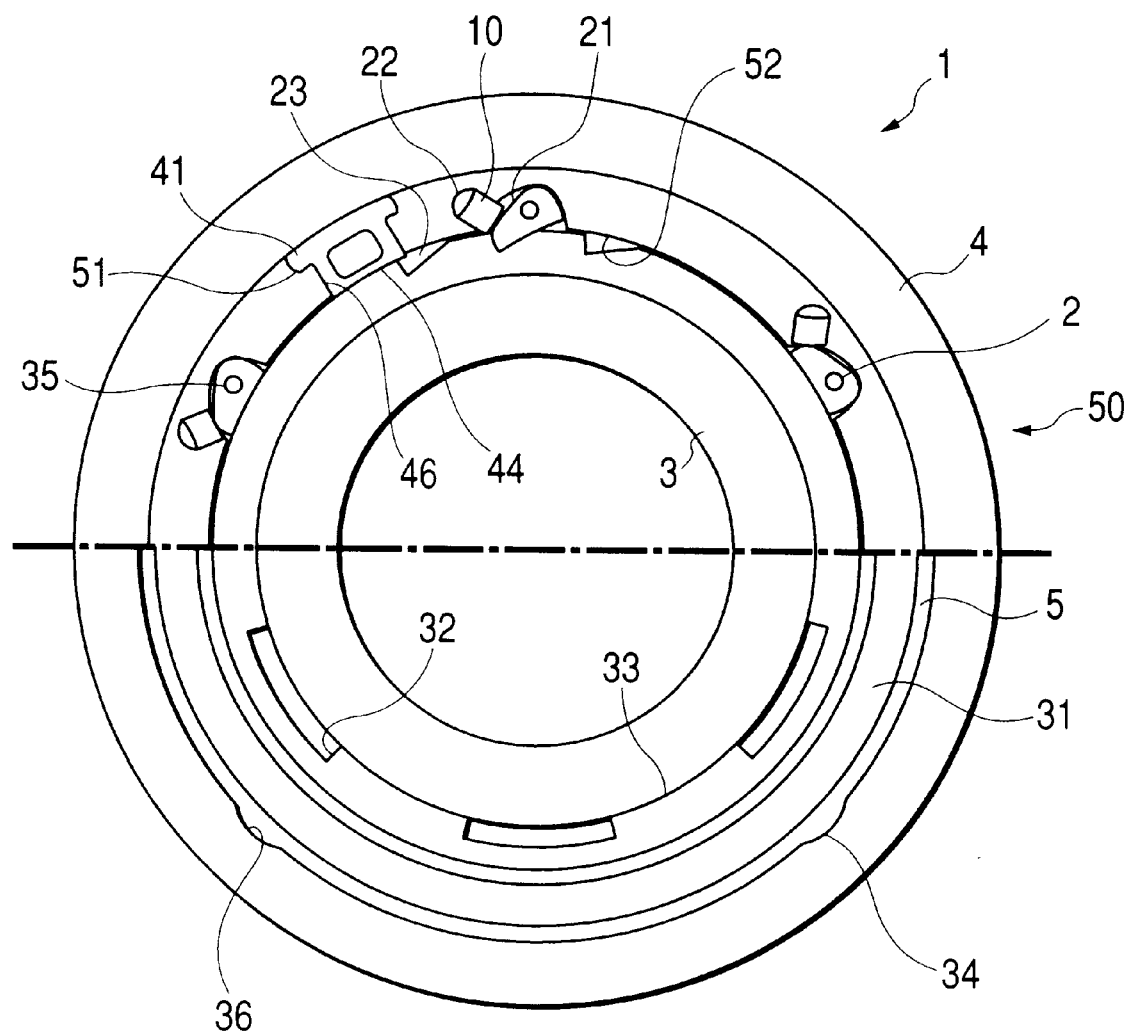
FIG. 1 is a front view which shows a one-way clutch used for a stator in accordance with a first embodiment of the present invention.
Figure 2:
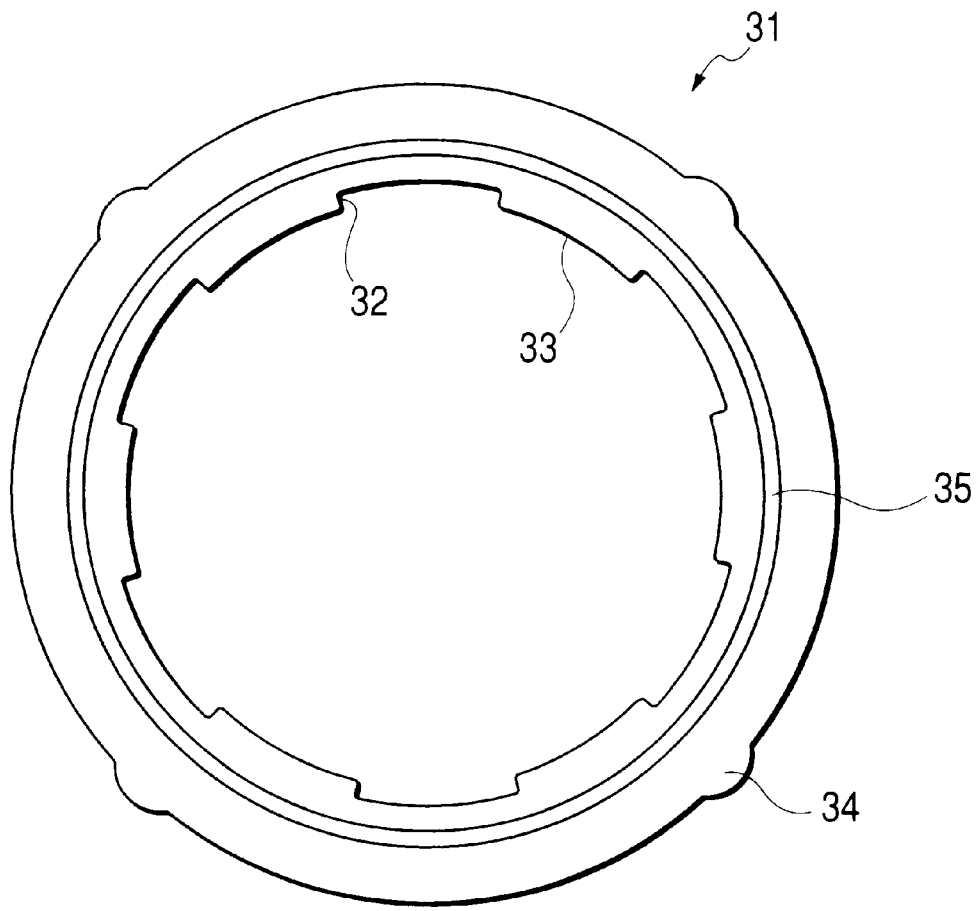
FIG. 2 is a front view which shows a ring plate type bearing.
Figure 3:
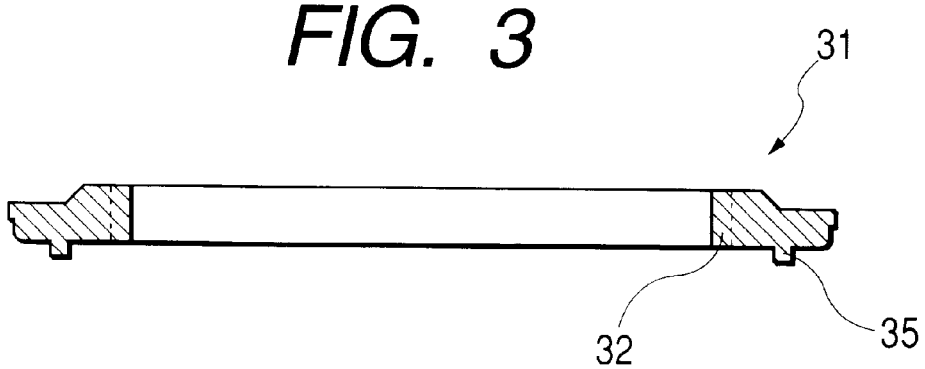
FIG. 3 is a sectional view which shows a plate type bearing, taken in the axial direction thereof.
Figure 4:
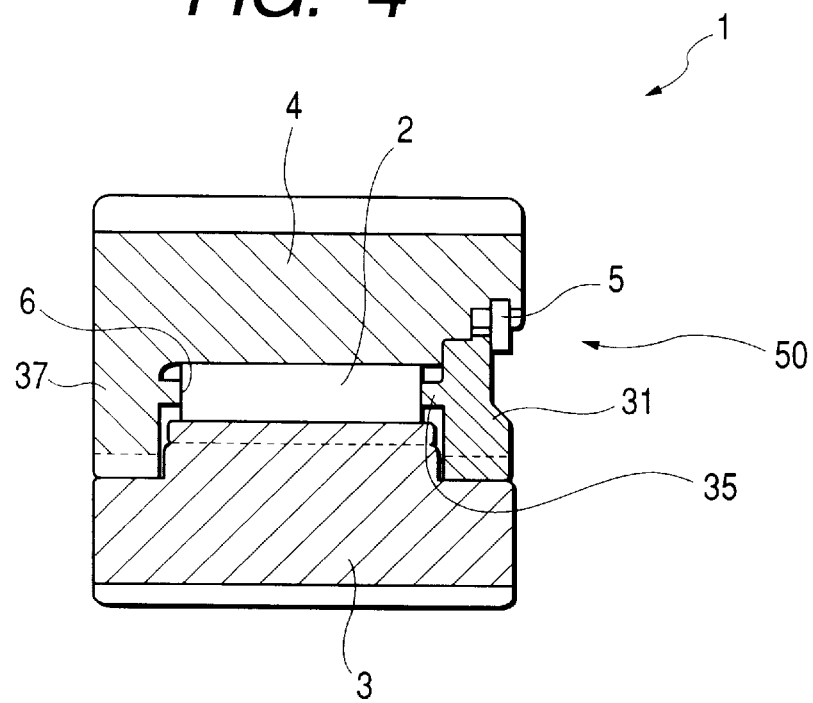
FIG. 4 is a sectional view which shows a one-way clutch, taken in the axial direction thereof.
Figure 5:
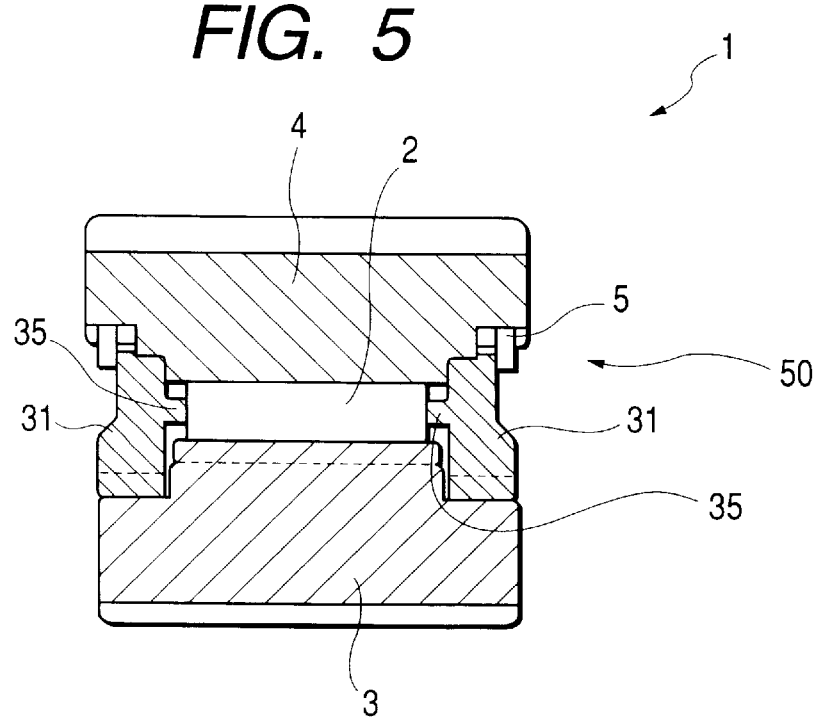
FIG. 5 is a sectional view which shows a one-way clutch using the plate type bearing on both sides in the axial direction, respectively, taken in the axial direction thereof.

FIGS. 1 to 5 are views which illustrate the ratchet one-way clutch in accordance with a first embodiment of the present invention (hereinafter, simply referred to as a "one-way clutch"). FIG. 1 is a front view of a one-way clutch used for a stator 1. FIG. 2 is a front view of a ring plate type bearing 31. FIG. 3 is a sectional view of the plate type bearing 31, taken in the axial direction thereof. FIG. 4 and FIG. 5 are views of the one-way clutch, taken in the axial direction thereof. In FIG. 4, the plate type bearing 31 is installed on one end in the axial direction thereof. In FIG. 5, each of the plate type bearings 31 is installed on both sides in the axial direction, respectively. In this respect, FIG. 1 shows the block bearing which will be described as a second embodiment hereof, that is, it also shows the pad type bearing 41. In FIG. 1, the one-way clutch 50 is formed by an outer race 4; an inner race 3 coaxially installed with the outer race 4, which is arranged to be relatively rotative; pawl members 2 each arranged between the inner race 3 and the outer race 4 to transmit torque by being engaged with the recessed portion 23 provided for the outer circumferential face of the inner race 3; and a bearing member 31 which is slidable on the outer circumferential face of the inner race 3. These constitute a part of the stator 1 of a torque converter (not shown).

The spring member, such as corrugated plate spring, that is, a spring 10, is arranged in each of the pockets 22 arranged in a designated number in the circumferential direction of the outer race 4. The spring 10 is in contact with the ratchet, namely, the pawl member 2, to bias the pawl member 2 in the direction in which it engages with the recessed portion 23. Also, the pawl member 2 is swingably housed in the pocket 21 which is cut to be provided for the inner circumferential face of the outer race 4 so as to be communicated with the recessed portion 23. The inner race 3 is fitted with a rotational member (not shown) by means of a spline (not shown) arranged for the inner circumference.

As shown in FIG. 2, the ring plate type bearing 31 is provided with a plurality of extrusions 34 on the outer circumference at the same intervals on the circumferential direction. The extrusion 34 engages with the recessed portion 36 arranged for the outer race 4 to face the extrusion 34 so as to fix the plate type bearing 31 exactly. Also, on the inner circumference of the plate type bearing 31, a plurality of recessed portions 32 are provided by cutting off the inner circumferential face. Between the recessed portions 32, there is formed each of the slidable portions 33 which is in contact with the outer circumferential face of the inner race 3. The recessed portions 32 are arranged in a designated number in the circumferential direction. The numbers of the extrusions 34 and recessed portions 32 are not necessarily limited to those shown in FIG. 2. It is of course possible to set them in numbers other than those shown therein.

As shown in FIG. 3, the bush, namely, the plate type bearing 31, is provided with an extrusion 35 on one end face in the axial direction. This extrusion 35 is in contact with the end face of the pawl member 2 in the axial direction when the extrusion is incorporated in the one-way clutch 50 as shown in FIG. 4 and FIG. 5, thus positioning the pawl member 2 in the axial direction, while supporting it.

FIG. 4 is a sectional view of the one-way clutch 50 in the axial direction, which shows the state where the plate type bearing 31 is fixed between the outer race 4 and the inner race 3. The plate type bearing 31 is fixed in the axial direction by means of the stopper ring 5 which is fixed to the outer race 4. Also, the extrusion 34 is fixed in the diametral direction, and the circumferential direction as well, by being fitted into the recessed portion 36 of the outer race 4.

The outer race 4 is provided integrally with a ring type flange 37 on the end portion on the side opposite to the plate type bearing 31. On the inner face of the flange portion 37, an extrusion 6 is arranged to protrude in the axial direction, and abuts against the side face of the pawl member 2 to support the pawl member 2 in the axial direction. Therefore, as shown in FIG. 4, the pawl member 2 is supported by the extrusion 35 of the plate type bearing 31 and the extrusion 6 of the flange portion 37 from both ends in the axial direction.

FIG. 5 is a sectional view of the one-way clutch 50 in the axial direction, which shows the state where the plate type bearing 31 is fixed between the outer race 4 and the inner race 3 as in FIG. 4. The plate type bearing 31 is fixed in the axial direction by means of the stopper ring 5 fixed to the outer race 4. Also, the extrusion 34 is fitted into an extrusion 36 of the outer race 4 to fix the bearing in the diametral direction and circumferential direction.

In FIG. 5, however, the outer race 4 is not provided with any flange portion. The pawl member 2 is supported by means of the plate type bearings 31 from both ends in the axial direction. The same plate type bearing 31 is used each on the left and right sides to face each other, but those in different shapes may be adoptable on the left and right sides, respectively. When bearings of different shapes are used, too, it is preferable to provide the extrusions 35 for supporting the pawl member 2.

As described above, with the provision of the recessed portions 32 for the plate type bearing 31, only the slidable portion 33 between the recessed portions 32 is allowed to slidably move on the outer circumference of the inner race 3. Therefore, it becomes possible to reduce the contact area. Also, it becomes possible to release from the recessed portions 32 the oil pressure exerted by the eccentric rotation on one side of the radial direction, hence reducing the dragging torque generated by the inner race 3 which is pushed to the outer race side due to oil pressure. Also, the recessed portions 32 become the passage for lubricant to pass. As a result, it becomes easier to supply lubricant into the interior of the one-way clutch. Also, with the provision of the recessed portions 32, it is implemented to make the entire body lighter for the plate type bearing 31.

Second Embodiment

Figure 6:
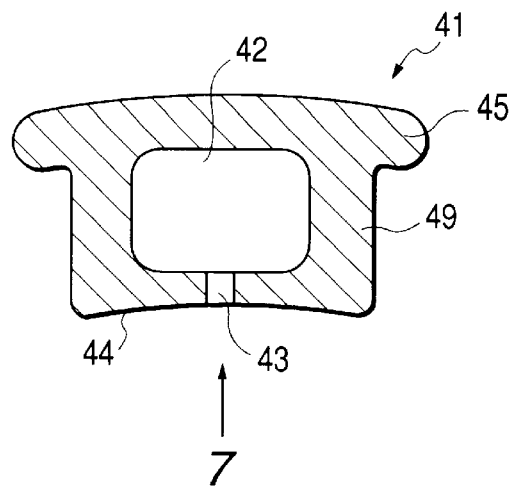
FIG. 6 is a cross-sectional view which shows a pad type bearing used for a ratchet one-way clutch in accordance with a second embodiment of the present invention, taken along line 6—6 in FIG. 7.
Figure 7:
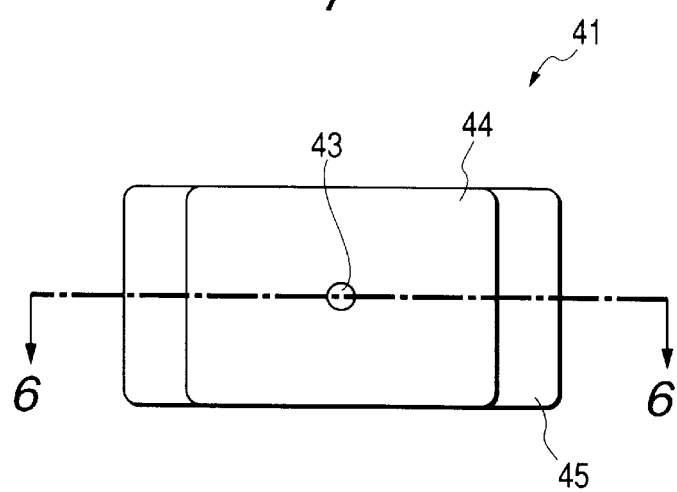
FIG. 7 is a bottom view which shows the pad type bearing, observed in the direction indicated by an arrow 7 in FIG. 6.

FIG. 6 and FIG. 7 illustrate the pad type bearing used for the ratchet one-way clutch in accordance with a second embodiment of the present invention. As in the first embodiment, the stator 1 can be used for the second embodiment. FIG. 6 is a cross-sectional view of the pad type bearing 41, taken along line 6—6 in FIG. 7. FIG. 7 is a bottom view of the pad type bearing 41 observed in the direction indicated by an arrow 7 in FIG. 6.

The pad type bearing 41 is fitted into a hole 46, shown in FIG. 1, arranged on the inner circumference of the outer race 4. In FIG. 1, only one hole is shown in the circumferential direction, but the number thereof is not limited. It is of course possible to arrange a plurality of holes. As clear from FIG. 6, the pad type bearing 41 comprises a larger diameter portion 45, and a smaller diameter portion 49 the width of which is greater than the larger diameter portion 45 in the axial direction but smaller in the circumferential direction. Almost on the central part of the smaller diameter portion 49, a through hole 42 is made to penetrate it in the axial direction.

As shown in FIG. 7, on the bottom face 44 of the pad type bearing 41, a bottom through hole 43 is cut to be communicated with the through hole 42. As a result, lubricant is allowed to flow from the bottom though hole 43 to the through hole 42, and from the through hole 42 to the bottom through hole 43 on the contrary, thus improving the lubricating capability of the one-way clutch.

Here, reverting to FIG. 1, the larger diameter portion 45 of the pad type bearing 41 is fitted into the fitting hole 51 of the outer race 4, and the smaller diameter portion 49 is fitted into the hole 46 whose diameter is smaller than that of the hole 51. Therefore, the larger diameter portion 45 of the pad type bearing 41 is regulated by the stepping portion between the hole 51 and the hole 46 so as to prevent it from falling off inwardly in the radial direction. In other words, the fixing precision is enhanced for the pad type bearing 41 with respect to the outer race 4. Also, the bottom face 44 of the pad type bearing 41 protrudes inwardly in the radial direction from the inner circumferential face 52 of the outer race 4, and only the bottom face 44 is allowed to slidably move on the outer circumferential face of the inner race 3. As a result, the contact area is reduced with respect to the inner race 3, hence reducing the dragging torque.

Also, in FIG. 1, both the pad type bearing 41 and the plate type bearing 31 are used, but only the pad type bearing 41 may be usable. Further, only the plate type bearing 31 may be usable. Using both of them it becomes possible to obtain the more effective result of dragging torque reduction, as well as the enhancement of lubricating capability.

In accordance with each of the embodiments described above, it may be possible to use a spring other than the corrugated one as the spring which is arranged for each of the pockets 22 of the outer race 4. For example, a coiled spring, an accordion spring, or the like may be usable.

Also, the structure is arranged so that the pawl member is provided for the pocket on the outer race side, which is fitted into the recessed portion provided on the inner race side, but the structure may be made reversely. In other words, the pawl member is provided for the pocket on the inner race side, which is fitted into the recessed portion provided on the outer race side.

The ratchet one-way clutch of the present invention demonstrates the following effects:

(1) With the provision of recessed portion for a bush or block bearing, it is possible to reduce the contact area of the inner race of the bush with the outer circumferential face, while releasing from the recessed portion the oil pressure exerted by eccentric rotation. As a result, while the dragging torque can be reduced, it becomes attainable to enhance the lubricating capability. It is, therefore, anticipated that the entire operation of the one-way clutch is made smoother, and the life thereof becomes longer.

(2) With the provision of recessed portion for a bush, and also, through holes for a block bearing, the block bearing or bush can be made lighter in weight.

(3) In accordance with the embodiments hereof, the bush is provided with fixing extrusions to enhance the fixing precision for the bearing member.

What is claimed is:

1. A ratchet one-way clutch comprising:
an inner race and an outer race coaxially arranged to be relatively rotative;
a pawl member arranged between said inner race and outer race to be fitted into a recessed portion provided for an outer circumferential face of said inner race or an inner circumferential face of said outer race for transmitting torque;
a spring for biasing said pawl member to the recessed portion; and a bush for supporting said pawl member axially and for providing a bearing between said inner race and outer race, wherein a recessed portion is formed on an inner circumferential face of said bush.

2. A ratchet one-way clutch according to claim 1, wherein an extrusion is provided for an outer circumference of said bush to protrude outwardly in the diametral direction, and said bush is fixed by said extrusion being fitted into a recess portion provided for said outer race.

3. A ratchet one-way clutch according to claim 1, wherein said bush is provided on both ends in the axial direction of said ratchet one-way clutch.

4. A ratchet one-way clutch according to claim 2, wherein said bush is provided on both ends in the axial direction of said ratchet one-way clutch.

5. A ratchet one-way clutch according to claim 1, further comprising:
   a block bearing provided at the inner circumference of said outer race.

6. A ratchet one-way clutch according to claim 2, further comprising:
   a block bearing provided at the inner circumference of said outer race.

7. A ratchet one-way clutch according to claim 3, further comprising:
   a block bearing provided at the inner circumference of said outer race.

8. A ratchet one-way clutch according to claim 4, further comprising:
   a block bearing provided at the inner circumference of said outer race.

9. A ratchet one-way clutch comprising:
   an inner race and an outer race coaxially arranged to be relatively rotative;
   a pawl member arranged between said inner race and outer race to be fitted into a recessed portion provided for an outer circumferential face of said inner race or an inner circumferential face of said outer race for transmitting torque;
   a spring for biasing said pawl member to the recessed portion; and
   an annular block bearing provided at the inner circumference of said outer race.

10. A ratchet one-way clutch according to claim 9, wherein said block bearing is provided with a through hole penetrating in the axial direction.

11. A ratchet one-way clutch according to claim 10, wherein a second through hole is provided to penetrate from said through hole to said inner race side.

12. A ratchet one-way clutch according to claim 11, wherein said block bearing is provided with an extrusion on a side portion thereof to protrude outwardly in the circumferential direction, and said block bearing is fixed by said extrusion being fitted into a recess portion arranged for said outer race.

13. A ratchet one-way clutch according to claim 10, further comprising:
   a bush for supporting said pawl member in the axial direction and for providing a bearing between said inner race and outer race,
   wherein a recessed portion is formed on an inner circumferential face of said bush.

14. A ratchet one-way clutch according to claim 11, further comprising:
   a bush for supporting said pawl member in the axial direction and for providing a bearing between said inner race and outer race,
   wherein a recessed portion is formed on an inner circumferential face of said bush.

15. A ratchet one-way clutch according to claim 12, further comprising:
   a bush for supporting said pawl member in the axial direction and for providing a bearing between said inner race and outer race,
   wherein a recessed portion is formed on an inner circumferential face of said bush.

* * * * *